United States Patent
Wu et al.

(10) Patent No.: US 6,704,846 B1
(45) Date of Patent: Mar. 9, 2004

(54) DYNAMIC MEMORY ARBITRATION IN AN MPEG-2 DECODING SYSTEM

(75) Inventors: Scarlett Z. Wu, Hillsborough, CA (US); Darren D. Neuman, San Jose, CA (US); Arvind B. Patwardhan, San Jose, CA (US)

(73) Assignee: LSI Logic Corporation, Milpitas, CA (US)

( * ) Notice: Subject to any disclaimer, the term of this patent is extended or adjusted under 35 U.S.C. 154(b) by 826 days.

(21) Appl. No.: 09/105,492

(22) Filed: Jun. 26, 1998

(51) Int. Cl.$^7$ ............................................. G06F 12/00
(52) U.S. Cl. ...................................................... 711/150
(58) Field of Search .............................. 710/52, 53, 54, 710/55, 56, 57, 240, 244; 711/150, 151, 158, 169

(56) References Cited

U.S. PATENT DOCUMENTS

| | | | | |
|---|---|---|---|---|
| 5,586,264 A | * | 12/1996 | Belknap et al. | 395/200.08 |
| 5,809,538 A | * | 9/1998 | Pollmann et al. | 711/151 |
| 5,867,735 A | * | 2/1999 | Zuravleff et al. | 710/52 |
| 5,926,647 A | * | 7/1999 | Adams et al. | 395/800.36 |
| 5,953,691 A | * | 9/1999 | Mills | 702/198 |
| 6,009,488 A | * | 12/1999 | Kavipurapu | 710/105 |
| 6,021,449 A | * | 2/2000 | Chow et al. | 710/57 |

* cited by examiner

Primary Examiner—Donald Sparks
Assistant Examiner—Christian P. Chace
(74) Attorney, Agent, or Firm—Conley Rose, P.C.

(57) ABSTRACT

A video decoding system includes an embedded microcontroller that provides memory arbitration in addition to processing and control functions. The microcontroller architecture provides a first-in, first-out (FIFO) queue for storing memory access instructions and a processing logic for executing software instructions. The microcontroller processing logic determines which components within the decoding system need access to memory and stores a sequence of memory access instructions into the FIFO queue. Each memory access instruction is associated with one decoder component. When main memory becomes available, a memory access instruction is dequeued from the FIFO and transmitted to the associated decoder component, which is then permitted to access memory. The microcontroller receives indicator signals from the decoder components that indicate when the decoder components have finished accessing memory and, thus, when the memory device is available for subsequent transactions.

20 Claims, 4 Drawing Sheets

DYNAMIC MEMORY ARBITRATION IN AN MPEG-2 DECODING SYSTEM

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

1. Field of the Invention

The present invention relates generally to the field of digital video compression and particularly to memory arbitration within a digital video decoder. More particularly, the present invention relates to a video decoder including a memory arbitration scheme that combines the advantages of hardware-based memory arbitration with the advantages of software-based memory arbitration.

2. Background of the Invention

Real-time processing of full motion video sequences using a digital recording, playback, or transmission system requires a large number of numerical computations and data transactions in a relatively short amount of time. Motion pictures typically are constructed using multiple still pictures which are displayed one at a time in sequence. To record the video sequence, each still picture, or "frame," must be digitally mapped onto a rectangular grid of pixels, each pixel representing the light intensity and color for a portion of the frame. In a Red-Green-Blue (RGB) system, each pixel includes three parameters which denote the intensity of the red, green, and blue light components, respectively, of that pixel. In accordance with the system defined by the National Television Standards Committee (NTSC), pixel data may also be described by a luminance parameter, which denotes the light intensity of the pixel, and two chrominance parameters, which describe the color of the pixel.

Although these systems specify only three parameters to describe each pixel, multiple frames must be displayed every second, each frame comprising hundreds of thousands of pixels if displayed on a typical computer monitor or television screen. In addition, it is usually desirable to include other multimedia information such as audio data along with the pixel data. As a result, a typical motion picture may involve many millions of data values that must be processed, stored, or transmitted each second. Because of the difficulty of building systems that can transmit and store audio and video data affordably at such high rates, various types of data compression algorithms have been introduced which allow the motion picture frames to be represented using a reduced amount of data. Video and audio systems which use these compression techniques require less storage space and transmission bandwidth, reducing the overall cost of the systems.

Video compression algorithms employ a number of techniques. Intraframe compression techniques seek to reduce the amount of data needed to describe a single picture frame, while interframe compression techniques reduce the amount of data needed to describe a sequence of pictures by exploiting redundancies between frames. The discrete cosine transform (DCT), used for interframe compression, is a mathematical process for determining a set of coefficients that describe the frequency characteristics of the pixels in a given picture frame. Because DCT coefficients can be converted back to pixel values using a mathematical process known as the Inverse DCT (IDCT), it is common in the art to represent frame data using DCT coefficients instead of the actual pixel values. Because the human eye is more responsive to lower frequencies in an image than to higher frequencies in a picture, a certain amount of high frequency picture information can be discarded or reduced without noticeably affecting the visual quality of a given frame. Once the DCT coefficients are determined, high frequency coefficients also can be quantized, a method which reduces the number of binary digits (or "bits") required to represent the coefficient values. Reducing the amount of high frequency information and/or quantizing the high frequency coefficients compresses the picture, reducing the amount of data needed to process, store, and transmit the picture.

Other intraframe compression techniques include run level encoding (RLE), zigzag ordering, and variable length encoding. Run-level encoding expresses a data sequence in terms of ordered pairs that consists of a number of zeroes between nonzero coefficients, and the value of the nonzero coefficient that terminates the run of zeroes. Zigzag ordering arranges the DCT components according to frequency, so that coefficients representing similar frequencies are stored and transmitted together. Zigzag ordering increases the effectiveness of the RLE technique, since some frequency components, especially high frequency components, tend to have numerous zero values. Variable length coding allows the data values to be represented using codewords which require, on average, fewer bits than the data values themselves. As a result, variable-length codes can be used to reduce the amount of storage space and transmission bandwidth required by the system. Some examples of video data compression formats are the Joint Photographic Experts Group (JPEG) format and the Graphic Interchange Format (GIF). It should be noted that compression techniques may be classified as either lossless (no image degradation) or lossy (some image degradation and that some compression formats are capable of producing a wide range of image qualities, varying from no degradation (lossless) to moderate or extreme degradation (lossy). For more information on coding, refer to *Digital Communications* by Proakis (McGraw-Hill, 1995) or *Elements of Information Theory* by Cover and Thomas (John Wiley & Sons, 1991).

Interframe compression techniques exploit redundancies between consecutive video frames, known as temporal redundancies. Because moving pictures often involve either very little motion or motion primarily of foreground objects, consecutive frames often are highly similar, increasing the effectiveness of interframe compression. Interframe compression generally involves storing the differences between successive frames in the data file instead of the actual frame data itself. Interframe compression begins by storing the entire image of a reference frame, generally in a moderately compressed format. Successive frames are compared with the reference frame, and only the differences between the reference frame and the successive frames are stored. Periodically, such as when new scenes are displayed, new reference frames are stored, and subsequent comparisons begin from this new reference point. The level of interframe compression achieved, known as the compression ratio, may be content-dependent; i.e., if the video clip includes many abrupt scene transitions from one image to another, the compression is less efficient. It is noted that the interframe compression ratio may be held constant while varying the video quality, however. Examples of names video compression techniques which use interframe compression are MPEG, DVI, and Indeo, among others. Using known techniques, the interframe-compressed pictures can be later reconstructed by a video decoder.

The International Organization for Standardization (ISO) has developed a number of compression standards for audio/video systems, namely the Motion Pictures Experts Group (MPEG) standards, which include MPEG-1 and MPEG-2. The ISO publishes the MPEG standards under the official name of ISO/IEC JTC1 SC29 WG11. The MPEG-1 standard defines data reduction techniques that include block-based motion compensation prediction (MCP), which generally involves differential pulse code modulation (DPCM). The MPEG-2 standard is similar to the MPEG-1 standard but includes extensions to cover a wider range of applications, including interlaced digital video such as high definition television (HDTV).

An MPEG data stream includes three types of pictures, referred to as the Intraframe (or "I-frame"), the Predicted frame (or "P-frame"), and the Bi-directional Interpolated frame (or "B-frame"). The I-frames contain the video data for an entire frame of video and are typically placed every 10 to 15 frames. Intraframes generally are only moderately compressed. Predicted frames are encoded with reference to a past frame, i.e., a prior Intraframe or Predicted frame. Thus P-frames only include changes relative to prior I-frames or P-frames. In general, P-frames receive a fairly high amount of compression and are used as references for future P-frames. Thus, both I- and P-frames are used as references for subsequent frames. Bi-directional pictures include the greatest amount of compression and require both a past and a future reference in order to be encoded. Bi-directional frames are never used as references for other frames.

Typically, as for the frame(s) following a reference frame (i.e., P-frames and B-frames), only small portions of these frames are different from the corresponding portions of the respective reference frame. Thus, for these frames, only the differences between frames are captured, compressed and stored.

When an MPEG encoder receives a video file or bitstream, the MPEG encoder generally first creates the I-frames. The MPEG encoder may compress the I-frame using an intraframe lossless compression technique. After the I-frames have been created, the MPEG encoder divides subsequent frames into a grid of 16×16 pixel squares called macroblocks, in order to perform motion estimation and compensation. The encoder searches for a best fit or best match between the target picture macroblock, i.e., the macroblock being encoded, and a block in one or more reference frames. For a target P-frame, the encoder searches in prior I-frames or P-frames. For a target B-frame, the encoder searches in a prior and subsequent I-frame or P-frame. When a best match to the target macroblock is found, the encoder encodes a vector movement code, or motion vector. The motion vector includes a pointer to the best fit reference frame block as well as information on the difference between the best fit block and the respective target block. The blocks in target pictures that have no change relative to the corresponding blocks in the reference frame are ignored. Thus the amount of data that is actually stored for these frames is significantly reduced.

After motion vectors have been generated, the encoder encodes the difference between corresponding macroblocks. Because human perception is more sensitive to brightness changes than color changes, the MPEG algorithm devotes more effort to reducing color space rather than brightness. Thus, each macroblock is divided into four 8×8 sub-blocks representing the brightness and two 8×8 sub-blocks representing the color. In order to represent all 256 pixels using only two 8×8 sub-blocks, the macroblocks are subsampled so that each pixel in a sub-block represents multiple pixels in the macroblock.

Once the I-frames, P-frames, and B-frames have been constructed to represent the video sequence with temporal compression, each frame may be further compressed individually. First, using the DCT, each sub-block is converted from a set of pixel values to the frequency domain. Each DCT coefficient is then quantized according to a set of predetermined quantization tables. The quantization step for each frequency can vary, taking into account the sensitivity of the human visual system (HVS) to the frequency. Since the HVS is more sensitive to low frequencies, many of the high frequency coefficients are coarsely quantized, resulting in some lost information. The DCT coefficients are reordered using a zigzag pattern and then run-level encoded. Because the high-frequency coefficients are more likely to be zero, run-level coding results in additional video compression. The video encoder then performs variable-length coding (VLC) on the run-level pairs. VLC is a reversible procedure for coding data that assigns shorter code words to frequent events and longer code words to less frequent events, thereby achieving additional video compression. Huffman encoding is a particularly well-known form of variable length coding.

The compressed video data then is ready to be transmitted to a remote location or stored for future decoding. In a live teleconferencing system, for instance, the compressed data is transmitted to a remote receiver which decodes the compressed bitstream for viewing. The video data may also be stored into a computer file for later retrieval or pressed onto a CD ROM or Digital Versatile Disk (DVD) for distribution or storage.

The MPEG-2 data format organizes the compressed bitstream into several syntax layers which identify specific portions of the video data. The outermost layer is called the Sequence (SEQ) Layer and simply identifies a sequence of related pictures comprising a movie or a portion of a movie. The Group of Pictures (GOP) Layer lies beneath the Sequence Layer. Each Group of Pictures contains one I-frame and multiple P-frames and B-frames. Further, there are two types of GOP Layers: open and closed. In a closed GOP Layer, the P-frames within a given GOP Layer are derived entirely from the I-frame in that GOP, while the B-frames within that layer are derived entirely from the I-frame and/or P-frames in that GOP. Thus, a closed Group of Pictures is self-sufficient in that the video frames within that GOP can be decoded using only the information within that GOP. In an open GOP Layer, the B-frames in the beginning of the layer may be encoded based on anchor frames in previous GOP layers. The Picture (PICT) Layer identifies a single frame of video and can hold any type of frame, an I-frame, P-frame, or B-frame. Below the Picture Layer is the Slice Layer, which represents a series of an arbitrary number of consecutive macroblocks. A slice may vary in size, although the first and last macroblock of a slice shall be in the same horizontal row of macroblocks. Hence, the minimum slice has a single macroblock, and the maximum slice includes an entire macroblock row from the video frame. Each slice is divided into macroblocks, which are grids of pixels having 256 elements organized into 16 rows and 16 columns. It follows that each slice comprises one or more rows of macroblocks. The Macroblock (MB) Layer further can be divided into the Block Layer, each block representing an 8×8 grid of pixels. Table I summarizes the layering format of the MPEG-2 bitstream.

TABLE I

MPEG-2 Layers, in hierarchical order.

| Layer Name | Description |
|---|---|
| Sequence | An entire movie or portion of a movie |
| Group of Pictures | A group of video frames within a Sequence, including only one I-frame |
| Picture | One I-frame, P-frame, or B-frame |
| Slice | One or more macroblocks along a horizontal row within a Picture |
| Macroblock | 16 by 16 grid of pixels within a Slice |
| Block | 8 by 8 grid of pixels within a macroblock. |

The composition of the MPEG-2 bitstream includes headers to denote the beginning of each layer. The header may contain specific information about the video sequence, such as the frame rate, or may even include video data, such as the motion vectors included within macroblock headers.

The video decoding process, employed to reconstruct a motion picture sequence from a compressed and encoded bitstream, generally is the inverse of the video encoding process. The decoder must first identify the beginning of a coded picture, identify the type of picture, then decode each individual macroblock within a particular picture. When encoded video data is transferred to a video decoder, the encoded video data is received and stored in a rate or channel buffer. The data is then retrieved from the channel buffer by a decoder or reconstruction device for performing the decoding process. When the MPEG decoder receives the encoded stream, the MPEG decoder reverses the above operations. Thus the MPEG decoder performs variable length decoding and inverse RLE, inverse scanning to remove the zigzag ordering, inverse quantization to de-quantize the data, and the inverse DCT to convert the data from the frequency domain back to the pixel domain. The MPEG decoder also performs motion compensation using the transmitted motion vectors to re-create the temporally compressed frames.

Reference frames, i.e., I-frames or P-frames, are decoded and stored into a frame buffer. Temporally compressed or encoded frames, such as P-frames or B-frames, are target frames and include motion vectors that point to reference blocks in neighboring I-frames or P-frames stored in the frame buffer. The neighboring I-frames or P-frames are known as anchor frames, since the target frames are decoded based on the anchor frames. The MPEG decoder locates the reference block in the anchor frame, as specified by the motion vector, and reconstructs the target macroblock by combining the reference macroblock with the pixel values for the target macroblock.

In order to reconstruct a B-frame, the two related anchor frames or reference frames must be decoded and available in a memory, referred to as the picture buffer. This is necessary since the B-frame was encoded relative to these two anchor frames. Thus the B-frame must be interpolated, or reconstructed, using both anchor frames during the reconstruction process.

As described above, as the encoded video data is decoded, the decoded data is stored into a frame buffer. In some configurations, the channel and frame buffers are incorporated into a single integrated memory buffer. The decoded data is in the form of decompressed or decoded I-frames, P-frames, or B-frames. A display processor retrieves the picture data for display by an appropriate display device, such as a TV monitor or the like.

Figure 1:
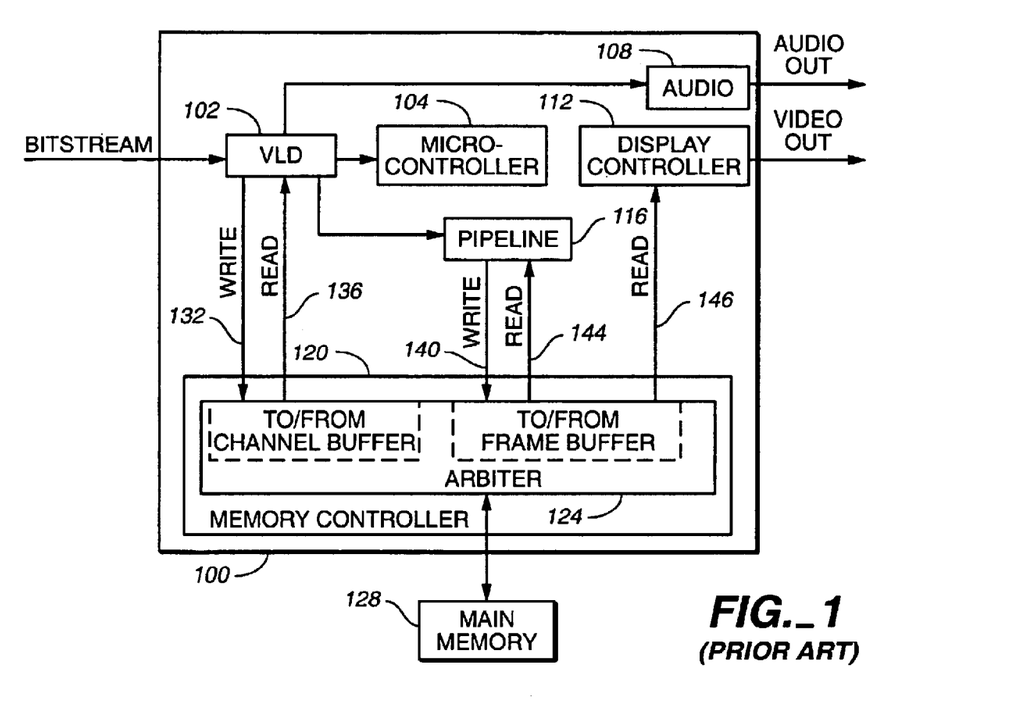
FIG. 1 illustrates a prior art video decoder that includes a hardware memory arbiter.

FIG. 1 illustrates an exemplary MPEG-2 decoder 100 which includes a variable length decoder (VLD) 102 coupled to a microcontroller 104, a memory controller 120, a pipeline unit 116, and an audio decoder 108. Memory controller 120 further couples to pipeline 116, a display controller 112, and a main memory device 128, such as a dynamic random access memory (DRAM) or a synchronous DRAM (SDRAM). The memory controller 120 includes a memory arbiter 124 which receives memory transactions from various devices within the decoder 100. FIG. 1 shows various devices connected to the arbiter 124 via READ signals for receiving data from the main memory 128 and via WRITE signals for storing data in memory. Accordingly, VLD 102 couples to the memory controller 120 via WRITE 132 and READ 136 signals, pipeline 116 couples to the memory controller 120 via WRITE 140 and READ 144 signals, and the display controller 112 couples to the memory controller 120 via READ signals 148. The decoder 100 may include other devices capable of read and write transactions with memory, as well. The arbiter 124 serves as a gateway to memory 128 by granting one memory request at a time.

The overall decoding process typically is controlled by the microcontroller 104, which asserts control signals (not shown) to the various data processing devices within decoder 100, such as the VLD 102, pipeline 116, audio decoder 108, and display controller 112. The control signals instructs these data processing devices, 102, 108, 116, and 112, when to process incoming data. The microcontroller thus controls the decoding process by asserting control signals to the data processing devices in the proper order. The microcontroller 104 further may receive status and handshaking signals from the data processing devices which indicate the status of those devices.

The VLD 102 parses the incoming compressed bitstream, routing the coded information to a portion of main memory 120 reserved for the channel buffer. The incoming bitstream may or may not be synchronized with the frames that are being decoded, i.e., frames in the bitstream may be stored into the channel buffer at an irregular rate. The VLD 102 next performs post-parsing, reading the compressed data from the channel buffer and decompressing the zigzag ordered, RLE/variable length encoded bitstream. The decompressed frame data, which includes DCT frequency coefficients and motion vectors, is transmitted to the pipeline 116 along with certain header data that allows the pipeline 116 to properly reconstruct the video frames. Header and control information typically is routed to the microcontroller 104, while audio data packets are routed to the audio decoder 108. The audio decoder 108 decodes the sound information independently from the video processing and provides an AUDIO OUT signal.

The pipeline 116 typically includes such circuitry as an inverse discrete cosine transform (IDCT) unit, a motion compensation (MC) unit, and a merge and store (MS) unit, which decode the compressed macroblocks using the DCT coefficients and motion compensation vectors. The pipeline unit 116 writes decoded frames into the frame buffer, from which the pipeline unit 116 may also access previously decoded I-frames and P-frames when decoding subsequent P-frames or B-frames.

The display controller 112 reads the pixel data for each frame from the frame buffer, providing a VIDEO OUT signal suitable for a display device. The display controller provides the video frames at regular time intervals according to a specific frame rate defined in the bitstream.

Because of the large number of memory accesses handled by the main memory 128, the arbiter 124 must be able to efficiently and fairly distribute grants for memory access between the VLD 102, pipeline 116, display controller 112, and any other device requesting memory access. Failure to timely grant certain memory requests may result in corrupted video output. For instance, the display controller 112 is required to transmit a frame of video within a fixed time interval. If a memory request by the display controller 112 is not met in time, then the display controller 112 will have no data to transmit, and the video sequence will appear corrupted. Similarly, if memory requests by the pipeline 116 are not met in time, then the video frames might not be decoded in time to be retrieved and displayed by the display controller 112. It is also important that the VLD 102 be given sufficient access to memory to allow the bitstream data to be captured and transmitted to the microcontroller 104, audio decoder 108, and pipeline 116. Due to the fact that all data processing within the decoder 100 must occur in real time, it is important that the arbiter 124 give each data processing device sufficient and timely memory. access.

The MPEG bitstream may vary greatly from one video sequence to the next and even between different parts of a given movie, however. For instance, the variable length coding process may provide better compression for some frame sequences than others, and some video frames may therefore require more or less decoding by the VLD 102 than do other frames. Similarly, some action sequences may require heavier DCT and motion vector processing, and the arbiter 124 must allow the pipeline 116 sufficient access to the frame buffer to decode the fast sequences without memory-starving the VLD 102 or display controller 112. As a result, the relative demands placed on the arbiter 124 by the VLD 102 and pipeline 116 may vary throughout the decoding process. Although memory arbiters have been designed that can efficiently handle numerous memory requests, it is difficult to design a memory arbiter that can dynamically adjust for these variations in memory demand.

Figure 2:
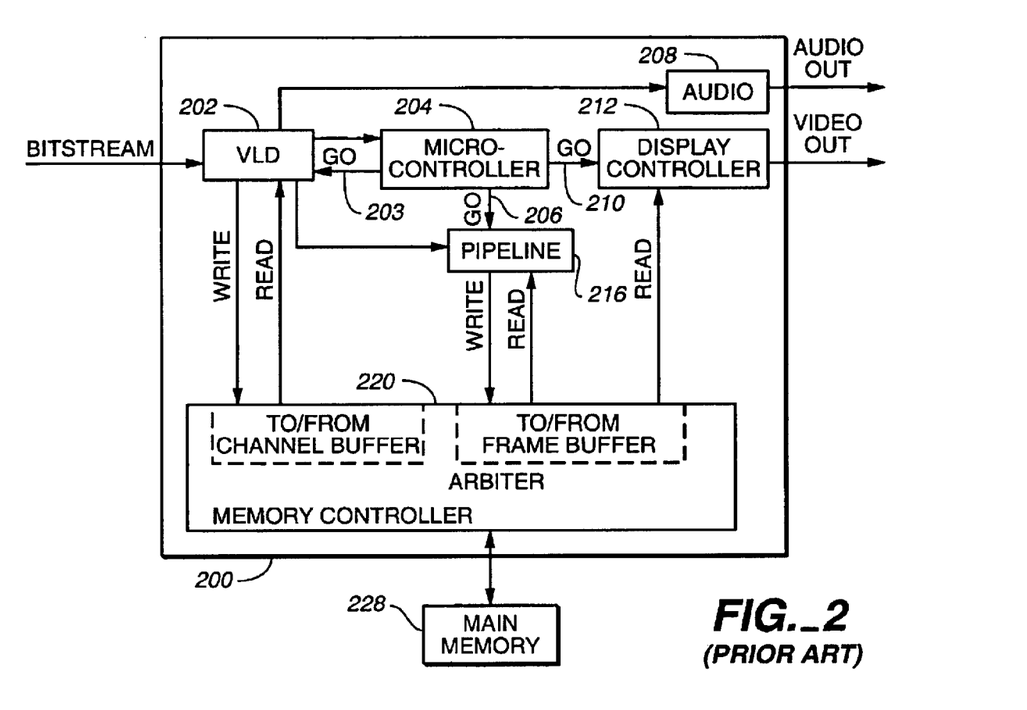
FIG. 2 illustrates a prior art video decoder in which memory arbitration is performed by executing software instructions.

FIG. 2 illustrates a similar architecture for an MPEG decoder 200, in which the microcontroller 204 is programmed to handle the memory arbitration. The microcontroller 204 receives status signals (not shown) from the various processing devices that indicate which devices need access to memory. To grant memory accesses, the microcontroller 204 asserts GO signals to the processing devices. In decoder 200, the VLD 202 receives GO signal 203, the pipeline unit 216 receives GO signal 206, and the display controller receives GO signal 208. Because the microcontroller 204 has access to header and control data contained in the bitstream, the microcontroller 204 may dynamically determine an appropriate balance of memory accesses to grant to the various processing devices. The microcontroller 204 then grants memory access to one device at a time by asserting a GO signal to that device. Under such a system, the memory controller 220 receives only one memory request at a time and does not need to arbitrate among memory requests. Further, the balance of memory requests between devices can be optimally adjusted according to the changing nature of the incoming bitstream. In addition, because the microcontroller operates according to internally stored software instructions, the programmer can update the microcontroller firmware at any time in order to improve the arbitration scheme.

One drawback to implementing memory arbitration with software, however, is that the microcontroller may not be capable of responding to memory requests as quickly as a hardware unit such as arbiter 124. A microcontroller typically handles one instruction at a time and loops repeatedly through the instructions. If a processing device transmits a memory request to the microcontroller 204, then the microcontroller 204 must process a string of instructions to determine which device is submitting the request, whether other devices are requesting memory access, whether the memory device is available, and whether the requesting device should receive priority over other devices requesting memory access. Accordingly, a microcontroller 204 often requires numerous processing cycles to grant memory requests and cannot react as quickly as a dedicated hardware device. As a result, it is difficult for a microcontroller-based arbitration scheme to successfully process video sequences with large amounts of data and/or quickly moving objects, also known as "killer streams." Such streams often appear corrupted onscreen because of the inability of the decoder to process the sheer amount of data in the required time period.

For the foregoing reasons, a memory arbitration scheme which combines the speed and responsiveness of a dedicated hardware arbiter with the flexibility and efficiency of software arbitration would greatly improve video decoder performance. Despite the apparent advantages that such a system would provide, to date, no such device has been developed that provides these features.

SUMMARY OF THE INVENTION

Accordingly, there is provided herein a decoding system that uses a memory arbitration scheme that combines the speed and responsiveness of hardware with the flexibility and efficiency of software to improve decoding system performance. In one embodiment, the decoding system is an MPEG decoder that comprises a memory device, a plurality of decoding units coupled to the memory device, and a microcontroller coupled to the memory device and decoding units. The decoder also includes a memory controller for facilitating memory transactions and a sub-picture unit capable of decoding graphic images such as on-screen menus to be combined with the video output. The decoding units, which include an audio unit, a variable length decoder, an IDCT unit, a motion compensation unit, a merge & store unit, and a display controller, generally perform the calculations necessary to decode the incoming video data and are capable of reading and writing from the memory device. The variable length decoder receives the incoming MPEG bitstream, stores the encoded MPEG data into a channel buffer, and decodes the zigzag-ordered, run-level-encoded MPEG data. The variable length decoder then parses the bitstream, transmitting audio packets to the audio unit, headers and control data to the microcontroller, and DCT coefficients to the IDCT unit.

The headers received by the microcontroller include motion vectors, which point to target macroblocks in a previously received target frame in the frame buffer. The microcontroller converts the motion vectors into memory addresses indicating the location of the target macroblocks in the frame buffer. The memory addresses are then transmitted to the motion compensation unit, which retrieves the target macroblocks from main memory. The IDCT unit converts the DCT coefficients into pixel data, which are sent to the merge & store unit. The merge & store unit combines the macroblock retrieved by the motion compensation unit with the pixel data to produce a new macroblock. The new macroblock is then stored into the frame buffer. If the new macroblock is part of an anchor frame, i.e., either an I-frame or a P-frame, then it may be used for decoding a subsequent target frame.

The display controller also couples to the memory device and periodically retrieves decoded video frames from the frame buffer. Based on the decoded frames, the display controller provides a video output signal suitable for a display device. The sub-picture unit retrieves sub-picture packets from main memory which represent bitmap graphics to be superimposed onto the video data. The sub-picture unit decodes the sub-picture packets, transferring the decoded graphics to the display unit. The display unit combines the sub-picture graphics with the video output signal.

The microcontroller manages the decoding units, asserting memory grant signals, or GO signals, to instruct the decoding devices when to operate and thereby when to access memory. The microcontroller thus handles arbitration for the memory device. The microcontroller also provides a GO signal to the memory controller indicating when to run refresh cycles. The memory device can only perform one memory transaction at a time, and the microcontroller must therefore issue only one GO signal one at a time.

Because of the varying nature of video sequences, the relative demand for memory access among the decoding units may change over time. Accordingly, the microcontroller is capable of determining how much memory access each device needs and issuing the GO signals accordingly. As a result, devices that need relatively few memory transactions are given fewer memory access opportunities in order to allow other devices more frequent access to memory. The microcontroller evaluates the bitstream headers to determine the video composition and can tailor the sequence of memory accesses according to the changing nature of the video sequence. By providing a flexible memory arbitration scheme, the decoding devices are better able to handle "killer" data streams than are conventional decoding devices.

In contrast with conventional software-based memory arbitration schemes, the present invention incorporates dedicated logic devices to issue the GO signals for memory access. The microcontroller generally comprises a control logic that receives headers and other bitstream data from the variable length decoder and feeds GO instructions to a first-in, first-out (FIFO) queue, known as the GOFIFO. The control logic also includes circuitry necessary to execute program instructions. Dequeue logic coupled to the GOFIFO unit receives memory ready signals from the decoding units and asserts a DEQUEUE signal if the memory device is idle and therefore ready to handle a memory transaction. If not empty, the GOFIFO dequeues one of the stored GO instructions in response to the DEQUEUE signal. The dequeued GO instruction is fed into a first 2×1 multiplexer, which provides a GO signal permitting one of the decoding units to access memory.

Because the GOFIFO issues the GO signals when the memory device is available, the control logic is allowed to focus on other aspects of the decoding process. Hence, the GOFIFO relieves the control logic from having to monitor the memory device to determine when memory transactions should be initiated. The control logic needs only determine the memory access sequence and queue the GO instructions into the GOFIFO. Because it is freed from processing numerous instruction cycles to monitor memory and initiate the GO signals, the control logic is able to operate more efficiently. Also, the GOFIFO and dequeue unit inherently are able to issue GO instructions faster than the control logic, since the GOFIFO is hardwired and does not have to execute a string of software instructions to operate. As a result, memory transactions can occur back-to-back with negligible delay, using the available memory bandwidth more efficiently.

The microcontroller circuit also includes a default GO unit for providing default memory grant signals when the GOFIFO is empty. The default GO unit receives the DEQUEUE signal from the dequeue logic and the FIFO_EMPTY signal from the GOFIFO. If the GOFIFO is empty, then the default GO logic asserts a GO signal in response to the DEQUEUE signal. The default GO unit provides a different GO signal each time, rotating through a subset of the GO signals that are available to the GOFIFO. In the preferred embodiment, the default GO unit is capable of providing GO signals for the variable length decoder, the display controller, and refresh cycle when the GOFIFO is empty. A second 2×1 multiplexer disposed between the GOFIFO and first 2×1 multiplexer receives GO signals from both the GOFIFO and the default GO unit. If the FIFO_EMPTY signal indicates that the GOFIFO is currently empty, then the second multiplexer selects a GO signal from the default GO unit. The second multiplexer selects a GO signal from the GOFIFO if the GOFIFO_EMPTY signal is deasserted, however. Because the default GO unit can provide GO signals for the variable length decoder, display controller, and refresh cycle, the MPEG decoder is capable of providing basic parsing and display functions and retaining the memory contents even if the control logic does not issue a GO instruction.

In the preferred embodiment, the control logic issues conditional GO signals that are executed only after the IDCT unit has finished processing. The conditional GO signals help the microcontroller to properly sequence the operations of the various decoding units. To facilitate the conditional GO instructions, the first multiplexer receives the output signal from the second multiplexer, i.e., a GO signal from either the GOFIFO or the default GO unit. The second multiplexer also receives an input signal that corresponds to a GO instruction for the variable length decoder. An AND gate receives a *COND_GO signal from the GOFIFO and also an inverted IDCT_RDY signal, providing an output signal to the control input terminal of the first multiplexer.

The output of the AND gate is asserted if the IDCT_RDY signal deasserted, indicating that the IDCT unit is processing, and if the *COND_GO signal is asserted, indicating that the dequeued signal represents a conditional GO instruction. If the AND gate output is asserted, then the first multiplexer transmits the GO signal corresponding to the variable length decoder, and the conditional GO instruction is delayed. When the IDCT unit finishes processing, as indicated by a deasserted IDCT_RDY signal, then the AND gate output signal will deassert, causing the first multiplexer to assert the GO signal corresponding to the conditional GO instruction. The conditional GO instruction is thereby delayed until the IDCT unit finishes processing. If the GOFIFO dequeues a GO instruction that is not conditional, then the *COND_GO signal causes the AND gate output to deassert, and the first multiplexer transmits the GO signal received from the GOFIFO. Accordingly, if the IDCT unit is not processing when the conditional GO instruction dequeues, then the first multiplexer will not delay asserting the conditional GO signal.

Thus, the present invention comprises a combination of features and advantages that enable it to substantially advance the art by providing a memory arbitration system that includes the flexibility and adaptability of software arbitration with the speed and efficiency of hardware arbitration. These and various other characteristics and advantages of the present invention will be readily apparent to those skilled in the art upon reading the following detailed description of the preferred embodiments of the invention and by referring to the accompanying drawings.

BRIEF DESCRIPTION OF THE DRAWINGS

A better understanding of the present invention can be obtained when the following detailed description of the preferred embodiment is considered in conjunction with the following drawings, in which.

DETAILED DESCRIPTION OF PREFERRED EMBODIMENTS

Figure 3:
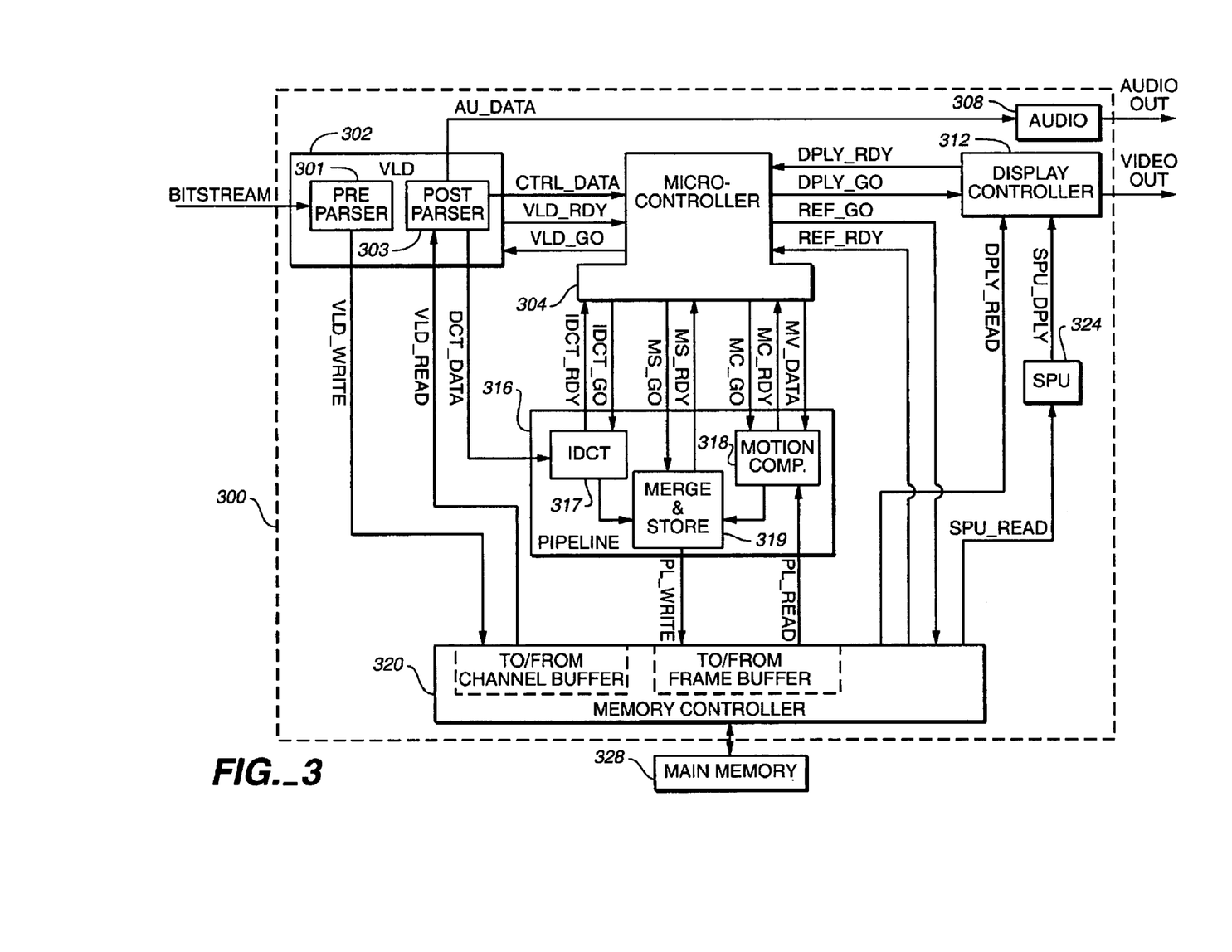
FIG. 3 illustrates a video decoder constructed in accordance with the preferred embodiment of the invention and including a microcontroller for arbitrating memory.

Turning now to FIG. 3, an MPEG decoder 300 constructed in accordance with the preferred embodiment of the invention includes an embedded microcontroller 304 coupled to a variety of decoding units, including a variable length decoder (VLD) 302, an audio unit 308, a display controller 312, and a pipeline unit 316. The microcontroller 304 further couples to a memory controller 320, which interfaces the MPEG decoder 300 to a memory device 328. Decoder 300 further includes a sub-picture unit (SPU) 324 disposed between the display controller 312 and the memory controller 320. The microcontroller 304 generally manages the overall decoding process by asserting GO signals to the various devices 302, 317, 318, 319, 320, and 312. The GO signals instruct the receiving device to begin calculation. The GO signals include VLD_GO (transmitted to the VLD 302), IDCT_GO signal (transmitted to the IDCT unit 316), MC_GO signal (transmitted to the motion compensation unit 318), MS_GO signal (transmitted to the merge & store 319), the REF_GO signal (transmitted to the memory controller 320), and DPLY_GO (transmitted to the display controller 312). In general, the microcontroller 304 asserts only one GO signal at a time, in order to prevent multiple devices from submitting memory requests at the same time. The microcontroller 304 receives various RDY signals, including a VLD_RDY signal from the VLD 302, an IDCT_RDY signal from the IDCT unit 317, an MC_RDY signal from the motion compensation unit 318, an MS_RDY signal from the merge & store unit 319, a REF_RDY signal from the memory controller 320, and a DPLY_RDY signal from the display controller 312. In an alternative embodiment, the memory controller 320 may provide a RDY signal to indicate that no devices are accessing main memory 328.

The VLD 302 comprises a pre-parser 301, for receiving and storing the incoming bitstream, and a post-parser 302, for decoding and routing the bitstream data. The pre-parser 301 preferably includes a first-in, first-out queue (FIFO, not specifically shown) that is used as a buffer for receiving bitstream data. The post-parser 302 preferably includes a data buffer (not specifically shown) for temporary data storage. Via the VLD_WRITE lines, the pre-parser 301 periodically empties the contents of its FIFO to a channel buffer within main memory 328. The post-parser 302 then loads its internal data buffer from the channel buffer via the VLD_READ lines and begins decompressing the bitstream data. Decompressing the bitstream data in the post-parsing stage generally involves variable length decoding, or decoding the variable length code, run level decoding, and zigzag reordering, according to the parameters given by the MPEG specification. The post-parser 302 then routes the decompressed channel buffer data to the audio unit 308, via the AU_DATA lines, to the microcontroller 304, via the CTRL_DATA signals, or to the pipeline 316, via the DCT_DATA signals. Because the memory controller 320 is adapted to receive only one memory request at a time, the pre-parser 301 and post-parser 302 access main memory 328 only when the VLD_GO signal is received from the microcontroller 304. The VLD 302 preferably includes an internal arbiter (not shown) to coordinate memory accesses by the pre-parser 301 and the post-parser 303.

The AU_DATA signal received by the audio unit 308 comprises audio data culled from the bitstream by the post-parser 302. The audio unit 308 decompresses and decodes the audio data and provides an AUDIO OUT signal.

The pipeline 316 comprises an inverse discrete cosine transform (IDCT) unit 316 and a motion compensation unit 318, each feeding output signals to a merge & store unit 319. The IDCT unit 316 receives decompressed DCT coefficients from the post-parser 302 via the DCT_DATA signal. The motion compensation unit 318, merge & store unit 319, and IDCT unit 316 begin operating in response to the MC_GO, MS_GO, and IDCT_GO signals, respectively, from the microcontroller 304. The microcontroller 304 also provides an MV_DATA signal to the motion compensation unit 318, for transmitting motion vectors. The merge & store unit 319 provides the PL_WRITE signals to the memory controller 320 for writing data to the frame buffer, and the motion compensation unit 318 receives data from the frame buffer via PL_READ signals. Accordingly, the motion compensation unit 318 and merge & store unit 319 are capable of accessing main memory 328 when the microcontroller 304 asserts the associated GO signals.

As shown in FIG. 3, various RDY signals are provided to the microcontroller 304 by the IDCT unit 316 (the IDCT_RDY signal), the motion compensation unit 318 (the MC_RDY signal), and the merge & store unit 319 (the MS_RDY signal). A RDY signal, when asserted, indicates that the unit asserting the RDY signal has finished processing the current input. Thus, the IDCT_RDY signal indicates that the IDCT unit 316 has completed one inverse transform, the MC_RDY signal indicates that the motion compensation unit 318 has completed motion compensation calculations, and the MS_RDY signal indicates that the merge & store unit 319 has finished merging the IDCT and motion compensation results.

The IDCT unit 316, motion compensation unit 318, and merge & store unit 319 provide the basic MPEG decoding functions for each picture. The IDCT unit 316 inverts the DCT coefficients received from the post-parser 302, resulting in the pixel difference values, or the values which describe the difference between an anchor frame macroblock and a target frame macroblock. If the frame currently being decoded is an Intraframe (I-frame), then the IDCT calculation completely determines the pixel values for the current frame; the pixel values are then transmitted to the merge & store unit 319 to be stored in main memory 328. If the current target frame is a P-frame or B-frame, then the target is decoded based on the IDCT and motion compensation values. Although not specifically shown in FIG. 3, the IDCT unit 317 preferably incorporates an internal random access memory (RAM) for facilitating the IDCT calculations.

The motion compensation unit 318 receives motion vectors from the microcontroller 304 and retrieves a previously decoded macroblock from the anchor frame data stored in the frame buffer. The motion compensation unit 318 provides the previously decoded macroblock to the merge & store unit 319, which combines the macroblock with the IDCT values to produce the target macroblock pixels. The merge & store unit 319 then stores the decoded pixel data into the frame buffer for subsequent retrieval by either the motion compensation unit 318 or the display controller 312.

The display controller 312 couples to the memory controller 320 via DPLY_READ signals, through which the display controller 312 regularly reads pixel data from the frame buffer. In order to manage memory transactions by the display controller 312, the microcontroller 304 receives a DPLY_RDY signal from the display controller 312 and also provides a DPLY_GO signal to the display controller 312. Upon receiving the DPLY_GO signal, the display controller 312 reads the pixel data for one picture from the frame buffer, and provides a suitable video output signal, labeled VIDEO OUT in FIG. 3. The display controller 312 asserts the DPLY_RDY signal to the microcontroller 304 to indicate that the video pixels have been read from the frame buffer.

The MPEG decoder 300 includes a sub-picture unit (SPU) 324 for processing graphical overlays that are superimposed onto the displayed video data. The SPU 324 receives SPU_READ signals from the memory controller 320 and transfers data to the memory controller 320 via SPU_DPLY signals. Graphical overlays handled by the SPU 324 may include such items as menus, on-screen control graphics, text, and other articles which appear superimposed onto the moving picture. If the MPEG decoder 300 is part of an interactive video system, such as a DVD player, then the SPU 324 preferably allows the DVD player to provide graphical, interactive feedback to the video display. In accordance with the DVD specification, compressed sub-picture data may be incorporated into the incoming bitstream. The SPU 324 decodes the compressed information and provides a decoded sub-picture frame to the display controller 312 via the SPU_DPLY signals. In the preferred embodiment, memory transactions by the SPU 324 are governed by the display controller 312 and only allowed when the DPLY_GO signal is asserted. The display controller 312 initiates memory transactions by the SPU 324 only when the display controller in not accessing main memory 328.

The memory controller 320 is constructed according to known techniques to receive a one of a plurality of possible memory read and write requests, transacting the received request with a memory device 328. The memory device 328 generally includes a conventional memory device or array of memory devices in which application programs and data are stored. Main memory 328 preferably comprises a synchronous dynamic random access memory (SDRAM) device but may alternatively comprise any suitable memory device such as dynamic random access memory (DRAM), extended data output DRAM (EDO DRAM), or Rambus™ DRAM. As is known to one of ordinary skill in the art, DRAM devices, including standard DRAM, SDRAM, EDO DRAM, and Rambus™ DRAM, must undergo periodic refresh cycles that recharge the DRAM storage elements. If the DRAM cells are not refreshed within a standard time interval, the information stored within the DRAM device might be lost. The memory controller 320 transacts refresh cycles with the main memory 328 in response to the microcontroller 304 asserting the REF_GO signal. During a refresh cycle, the memory controller 320 may not transact any other memory request. When the refresh cycle is complete, the memory controller 320 preferably asserts the REF_RDY signal, indicating to the microcontroller 304 that other devices may access main memory 328.

Figure 4:
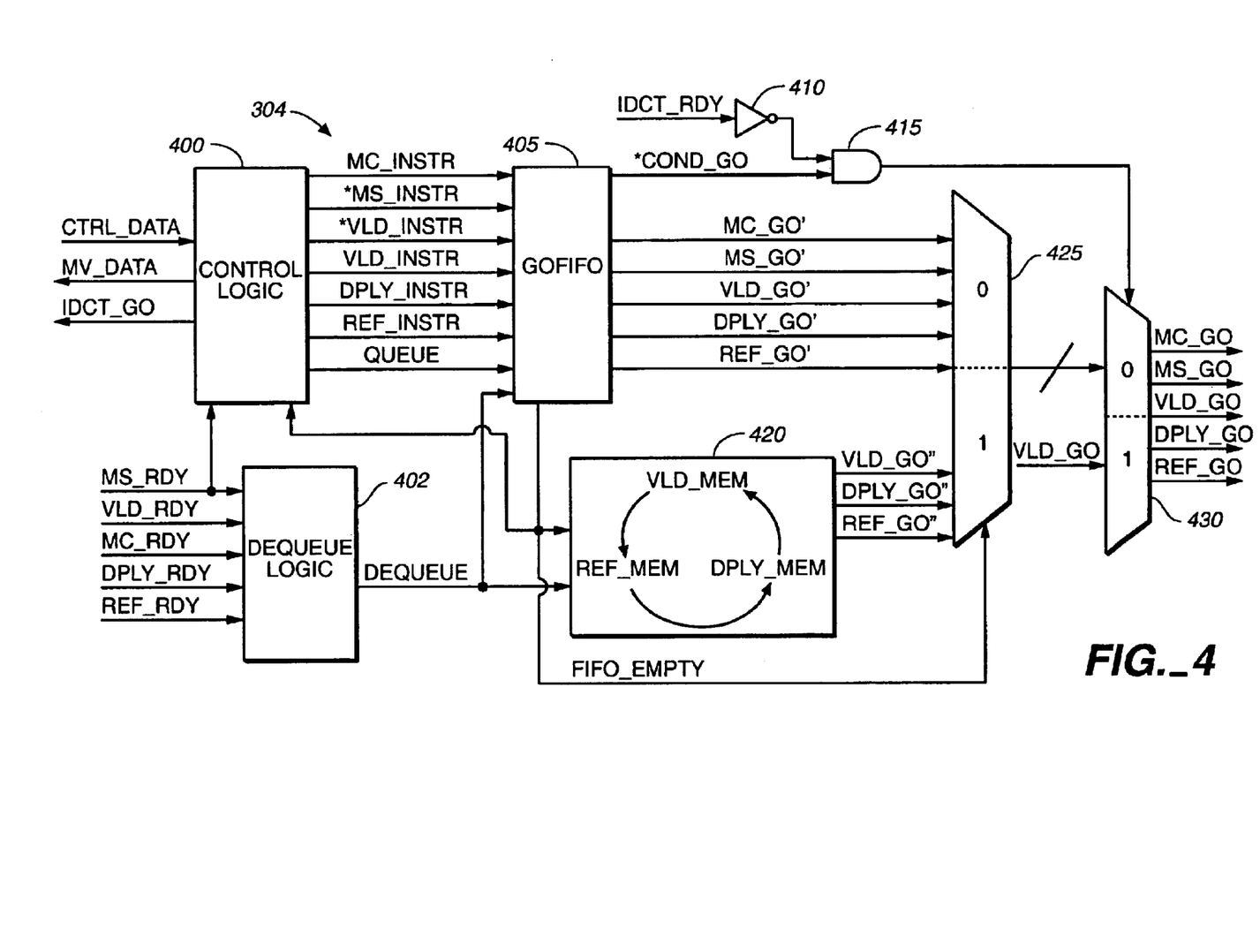
FIG. 4 illustrates the preferred embodiment of the microcontroller of FIG. 3, which includes a queue for storing memory arbitration instructions.

Referring now to FIGS. 3 and 4, the microcontroller 304 preferably comprises control logic 400, a first-in, first-out queue (FIFO) 405 (or "GOFIFO 405"), and a plurality of logic devices, including dequeue logic 402, inverter 410, AND gate 415, multiplexers 425 and 430, and default GO unit 420. The control logic 400 receives the CTRL_DATA signal from the VLD 302 and the MS_RDY signal from the merge & store unit 319. The control logic 400 also provides a QUEUE signal to the GOFIFO 405, provides the MV_DATA lines to the motion compensation unit 318, and drives the IDCT GO signal to the IDCT unit 317. The control logic 400 also provides INSTR signals for queueing GO instructions into the GOFIFO 405, including MC_INSTR, *MS_INSTR, *VLD_INSTR, VLD_INSTR, DPLY_INSTR, and REF_INSTR.

The GOFIFO 405 is capable of storing (queueing) input data, as well as outputting (dequeueing) stored data. GOFIFO 405 preferably operates as a standard first-in, first-out queue, wherein the data is dequeued in the same order in which it is queued. The GOFIFO 405 asserts a FIFO_EMPTY signal to the default GO unit 420, to the control logic 400, and to the control input terminal of multiplexer 430 to indicate that no entries are stored in the GOFIFO 405. Dequeue logic 402 provides a DEQUEUE signal to GOFIFO 405 and to default GO unit 420. If not empty, GOFIFO 405 preferably dequeues one data entry when the DEQUEUE signal is pulsed. GOFIFO 405 provides a *COND_GO signal to AND gate 415 and a plurality of GO' signals to multiplexer 425, including MS_GO', MC_GO', VLD_GO', DPLY_GO', and EF_GO'. The GO' signals represent the dequeued data and may be called primary GO signals.

Each GO instruction corresponds to a specific decoding unit. MC_INSTR corresponds to the motion compensation unit 318, *MS_INSTR corresponds to the merge & store unit 319, VLD_INSTR and *VLD_INSTR correspond to the VLD 302, DPLY_INSTR corresponds to the display controller 312, and REF_INSTR corresponds to the refresh command that is issued to the memory controller 320. The *MS_INSTR and *VLD_INSTR represent conditional GO instructions, as will be discussed in greater detail below. When a conditional GO instruction is dequeued, the GOFIFO 405 asserts the *COND_GO signal. Table II below summarizes the output signals of GOFIFO 405 according to which GO instruction in dequeued.

TABLE II

| GOFIFO output signals. | | |
|---|---|---|
| Dequeued GO Instruction | Asserted GO' Signal | State of *COND_GO Signal |
| VLD_INSTR | VLD_GO' | deasserted |
| *VLD_INSTR | VLD_GO' | asserted |
| MC_INSTR | MC_GO' | deasserted |
| *MS_INSTR | MS_GO' | asserted |
| DPLY_INSTR | DPLY_GO' | deasserted |
| REF_INSTR | REF_GO' | deasserted |

The multiplexers 425 and 430 essentially operate as switches, the states of which are selected by control input signals. In FIG. 4, the state of multiplexer 425 is selected by the FIFO_EMPTY signal, while the state of multiplexer 430 is selected by the output signal of AND gate 415. Multiplexers 425 and 430 each comprise two inputs nodes, each input node receiving a plurality of input signals, and one output node having the same number of signals as a single input node. The signals provided by an output node connect to the corresponding signals of one of the input nodes, depending on the state of the select input signal. A multiplexer, therefore, may be thought of either as a bank of switches controlled by a common control signal or a single switch capable of routing several signals simultaneously.

Dequeue logic 402 receives the RDY signals, including VLD_RDY, MC_RDY, MS_RDY, DPLY_RDY, and REF_RDY. Inverter 410 receives the IDCT_RDY signal, feeding the inverted IDCT_RDY signal to AND gate 415. The output terminal of AND gate 415 couples to the control terminal of multiplexer 430, to select the output of multiplexer 430. Default GO unit 420 provides VLD_GO", DPLY_GO", and REF_GO" signals to multiplexer 425. The output signal of multiplexer 425, which is selected according to the state of the FIFO_EMPTY signal, drives multiplexer 430. If the FIFO_EMPTY signal is asserted, then multiplexer 425 transmits one of the GO" signals from the default GO unit 420 to multiplexer 430. If the FIFO_EMPTY signal is deasserted, then multiplexer 430 transmits one of the primary GO signals (GO') received from the GOFIFO 405. Multiplexer 430 drives the GO signals that are transmitted to the decoding units, including VLD_GO, MC_GO, MS_GO, DPLY_GO, and REF_GO. Table III, below, represents the truth table that lists which GO signal is asserted by multiplexer 430, according to the output signals provided by the GOFIFO 405 and the default GO unit 420 and the control input signals to multiplexers 425 and 430. Note that the GOFIFO 405 and the default GO unit 420 may assert only one GO signal at a time, as will be discussed in greater detail below.

TABLE III

Truth table for GO signals asserted by multiplexer 430.

| Primary GO (GOFIFO) | Default GO Output | FIFO_ EMPTY | AND gate 415 Output | GO Signal |
|---|---|---|---|---|
| MC_GO' | don't care | deasserted | deasserted | MC_GO |
| MS_GO' | don't care | deasserted | deasserted | MS_GO |
| VLD_GO' | don't care | deasserted | deasserted | VLD_GO |
| DPLY_GO' | don't care | deasserted | deasserted | DPLY_GO |
| REF_GO' | don't care | deasserted | deasserted | REF_GO |
| don't care | VLD_GO" | asserted | deasserted | VLD_GO |
| don't care | DPLY_GO" | asserted | deasserted | DPLY_GO |
| don't care | REF_GO" | asserted | deasserted | REF_GO |
| don't care | don't care | deasserted | asserted | VLD_GO |

The control logic 400 handles the processing and control functions of the microcontroller 304. Control logic 400 preferably includes an internal ROM device (not shown) for storing program instructions and circuitry to implement standard mathematical and control functions. Accordingly, control logic 400 preferably operates according to the program instructions stored in internal ROM. Control logic 400 may further include various input and output ports (not specifically shown) for controlling external devices, implementing read and write transactions with a memory storage device, receiving interrupt signals, and communicating with other control devices. Control logic 400 may comprise a standard microcontroller or a processing device capable of being embedded into an Application Specific Integrated Circuit (ASIC) or other integrated circuit. The program instructions preferably include instructions for determining the order of transactions with main memory 328.

The macroblock headers received by the microcontroller 304 include motion vectors that indicate specific macroblocks within the anchor frames associated with the target frame being decoded. Because anchor frames always precede target frames in the bitstream, a motion vector always refers to a macroblock that has been previously stored into the frame buffer. Hence, to access a particular macroblock, the motion compensation unit 318 must be provided with the memory address of the anchor frame macroblock. The control logic 400 thus determines and transmits the memory location corresponding to each motion vector and transmits this memory location over the MV_DATA lines to the motion compensation unit 318.

In order to load the GOFIFO 405, the control logic 400 asserts one of the INSTR signals and pulses the QUEUE signal. When the QUEUE signal is pulsed, the GOFIFO 405 queues the GO instruction identified by the asserted INSTR signal. Because the GOFIFO 405 preferably comprises a FIFO queue, the order in which the GO instructions are written to the GOFIFO 405 necessarily determines the memory transaction order. Further, because the control logic 400 only asserts one INSTR signal when loading the GOFIFO 405, only one GO' signal is asserted at a time when the GOFIFO 405 dequeues a GO instruction.

The DEQUEUE signal provided by the dequeue logic 402 to the GOFIFO 405 causes the GOFIFO 405 to dequeue the least-recently-stored entry. Because the RDY signals indicate which devices are active, the dequeue logic 402 is capable of quickly determining when main memory 328 is available for a memory transaction. Hence, if each of the RDY signals is asserted, indicating that no device is accessing main memory 328, then the dequeue logic 402 pulses the DEQUEUE signal. Hence, the bank of RDY signals may thought of collectively as an indication of whether the memory device is available for access. In fact, the memory controller 320 in an alternative embodiment may provide a MEM_RDY signal that indicates that no devices are accessing main memory 328. Accordingly, the dequeue logic 402 may assert the DEQUEUE signal in response to the MEM_RDY signal alone.

The CTRL_DATA signal, parsed from the incoming bitstream by the VLD 302, includes layer headers, motion vectors, and other data that describe how the MPEG data is to be decoded. Accordingly, the control logic 400 determines, based on the contents of the CTRL_DATA signal, the appropriate sequence of memory accesses by the VLD 302, the motion compensation unit 318, the merge & store unit 319, the display controller 312, and the refresh cycles. As the sequence of memory accesses is determined, the control logic 400 loads the GOFIFO 405 with GO instructions (via the INSTR lines) that identify which devices should access memory. Because the IDCT unit 317 preferably does not access main memory 328, the control logic 400 asserts the IDCT_GO signal. The control logic 400 preferably takes into account the following constraints when determining the memory transaction order:

1. The data buffers within the pre-parser 301 and post-parser 303 shall not be allowed to become empty.
2. The VLD 302 shall not supply data to both the microcontroller 304 and pipeline 316 at the same time.
3. The merge & store unit 319 shall not start processing the current macroblock until the IDCT unit 316 and motion compensation unit 318 have finished processing the current macroblock.
4. The IDCT unit 316 shall not start processing the next macroblock until the merge & store unit 319 has finished processing the previous macroblock.

The first constraint ensures that the bitstream data will be parsed and distributed in a timely manner to each decoding unit, i.e., the microcontroller 304, pipeline 316, and audio unit 308. If the buffer within the VLD 302 is empty, then the post-parser 303 will have no data to parse. Because the decoder 300 must decode the MPEG bitstream in real time, it is inefficient and, thus, undesirable for the post-parser 303 to be idle. It is important that the VLD 302 be given sufficiently frequent access to memory to allow the pre-parser 301 to write the incoming bitstream data to the channel buffer and for the post-parser 303 to read data for all of the decoding units.

The second constraint stems from the fact that the DCT coefficients in the bitstream will never be intermixed with the header and motion vector data, in accordance with the MPEG specification. In other words, a control mechanism is required to arbitrate between parsing for DCT coefficients and parsing for header and motion vector data.

The third constraint is necessary since, according to the data path of pipeline 316, the merge & store unit 319 follows the IDCT unit 316 and the motion compensation unit 318. The merge & store unit 319 merges and stores the results of the IDCT and motion vector calculations. Hence, it is impermissible for the merge & store unit 319 to begin processing before the IDCT and motion vector results are available; the merge & store operations must precisely begin at the proper times relative to the IDCT and motion compensation operations.

When the IDCT unit 316 finishes inverting the DCT coefficients for the current macroblock, the VLD 302 is relieved from supplying data to the IDCT unit 316 and is allowed to supply the header and motion vector data for the next macroblock to the microcontroller 304. At the same time, the motion compensation unit 318 and the merge & store unit 319 may continue to process the current macroblock. When the microcontroller 304 finishes parsing the header and motion vector data for the next macroblock and is ready to instruct the VLD unit 302 to start transferring DCT coefficients to the IDCT unit 316, the fourth constraint above ensures that the IDCT operation for the next macroblock has to wait until the merge & store unit 319 completes the current macroblock. This constraint is needed due to the fact that a single memory buffer is used for storing the IDCT result for each macroblock. If the IDCT unit 316 begins inverting DCT coefficients for the next macroblock while the merge & store unit 319 is still processing the current macroblock, then the IDCT calculations for the current macroblock may be lost.

The second and fourth constraints are met by placing the microcontroller 204 in charge of determining when to parse the header and motion vector data and when to activate the IDCT unit 316. As for the second constraint, the microcontroller 204 preferably asserts the IDCT_GO signal only after it finishes parsing the header and motion vector data. After asserting the IDCT_GO signal, the microcontroller 204 preferably waits until the IDCT_RDY signal is asserted before parsing the header and motion vector data for the next macroblock. As for the fourth constraint, before issuing the IDCT_GO signal, the microcontroller 204 always verifies that the FIFO_EMPTY and MS_RDY signals are deasserted to ensure that the previous macroblocks have been fully processed, including the merge & store operation. As a result, the IDCT operation is allowed to begin only if it will not overwrite data that is being used to process IDCT data for the previous macroblock.

The conditional GO instructions submitted to the GOFIFO 405 by the control logic 400 help to ensure that the third constraint is met. If the GOFIFO 405 dequeues a conditional GO instruction, multiplexer 430 does not assert the GO signal corresponding to the conditional GO instruction unless the IDCT unit 316 has finished processing the current macroblock. As stated above, the IDCT_RDY signal is asserted by the IDCT unit 316 to indicate that the current macroblock is finished. Accordingly, the *VLD_INSTR instruction indicates that, after the IDCT_RDY signal is asserted, the VLD_GO signal should be asserted to allow the VLD 302 to access memory. Likewise, the *MS_INSTR instruction indicates that, after the IDCT_RDY signal is asserted, the MS_GO signal should be asserted to allow the motion compensation unit 318 to access main memory 328.

In response to a pulse of the DEQUEUE signal, the GOFIFO 405 dequeues a GO instruction by asserting one of the primary GO signals, MS_GO', MC_GO', VLD_GO', DPLY_GO', or REF_GO'. If the instruction being dequeued represents a conditional instruction, then the GOFIFO 405 asserts both the *COND_GO signal and the GO' signal most closely corresponding to the conditional GO instruction. For instance, if the *MS_INSTR instruction is dequeued, corresponding to a conditional merge & store GO instruction, then the GOFIFO 405 asserts the *COND_GO and MS_GO' signals. Similarly, the *COND_GO and VLD_GO' are asserted if the *VLD_INSTR conditional GO instruction is dequeued. The GOFIFO 405 asserts the VLD_GO', DPLY_GO', and REF_GO' signals when the instructions being dequeued are VLD_INSTR, DPLY_INSTR, and REF_INSTR, respectively. The GO' signals feed multiplexer 425, the output of which is controlled by the FIFO_EMPTY signal. If the FIFO_EMPTY signal is deasserted, indicating that the GOFIFO 405 is not empty, then the multiplexer 425 transmits the primary GO signal asserted by the GOFIFO 405.

If the GOFIFO 405 is empty, however, as indicated by the FIFO_EMPTY signal being asserted, then a suitable GO instruction is provided to multiplexer 425 by the default GO unit 420. The default GO unit 420 alternately provides the VLD_INSTR instruction, the REF_INSTR instruction, or the DPLY_INSTR instruction. Hence, memory arbitration will alternate between the VLD 302, the display controller 312, and the refresh cycle if the GOFIFO 405 is empty.

Multiplexer 430 drives one of the GO signals, MC_GO, MS_GO, VLD_GO, DPLY_GO, or REF_GO, depending on the states of the IDCT_RDY and *COND_GO signals. If the *COND_GO signal is deasserted, causing the output of AND gate 415 to be deasserted, then the output of multiplexer 425 determines which GO signal is asserted by multiplexer 430. If the *COND_GO signal is asserted, indicating that the MEM_GO signal represents a conditional GO instruction, then the GO instruction output by multiplexer 430 depends on the state of the IDCT_RDY signal. If the IDCT_RDY signal is deasserted, indicating that the IDCT unit 316 is operating, then multiplexer 430 asserts the VLD_GO signal. If the IDCT_RDY signal is asserted, however, indicating that the IDCT unit 316 has finished the current calculation, then multiplexer 430 asserts the GO signal associated with the output of multiplexer 425. Thus, if the output signal of the GOFIFO 405 represents a conditional GO instruction, then multiplexer 430 delays asserting the conditional GO signal until the IDCT unit 316 has finished the current calculation. During the delay, i.e., until the IDCT calculation is finished, the VLD_GO signal is repeatedly issued to ensure that the VLD 302 buffers are serviced often enough to supply DCT coefficients to the IDCT unit.

The present invention thus allows the control logic 400 to determine the order of memory transactions and provides a GOFIFO 405 with associated logic to efficiently issue the GO signals. The control logic 400 determines the best way to distribute memory transactions among the devices within decoder 300, storing GO instructions into the GOFIFO 405 to indicate the order of memory transactions. As main memory 328 becomes available, the GO instructions are dequeued from the GOFIFO 405 and asserted as GO signals to the memory controller 320 and the various decoding units 302, 317, 318, and 319. As a result, the microcontroller 304 may implement virtually any desired memory arbitration scheme without having to process software instructions to issue memory access grants. Issuing queued GO instructions from the GOFIFO 405 ensures the most efficient use of main memory 328, minimizing the amount of time that main memory 328 is idle and waiting for the next memory transaction.

The architecture described herein advantageously allows memory arbitration decisions to be made using a software program but implemented through a hardware circuit. Through software instructions, the control logic makes the decisions that determine the sequence of memory accesses, while the FIFO can quickly dequeue GO instructions to allow memory access. The resulting memory arbitration system comprises the benefits of hardware arbitration and the benefits of software arbitration. Because the arbitration decisions are initiated through software, the microcontroller can tailor the sequence of memory accesses according to the content of the incoming bitstream data. Although required in conventional software arbitration, however, the microcontroller program in the present invention is liberated from monitoring the memory device to determine when the memory transactions can occur. In essence, the FIFO queue offloads the responsibility for initiating the memory accesses from the software program. As a result, other software routines running on the microcontroller execute more efficiently. Because a hardware circuit monitors the memory device and responsively initiates memory transactions when the memory device is idle, a minimum of time is wasted between memory transactions. Hence, the memory device is used more efficiently and is better capable of servicing numerous memory requests in a short period of time. By providing highly efficient and frequent access to memory, the resulting architecture enables a real-time system to quickly process "killer" data streams without the decoding failures normally associated with such data.

One of ordinary skill in the art will immediately recognize, upon reading this disclosure, numerous systems and devices that would benefit from teachings herein. In particular, it should be understood that the memory arbitration system described herein could be integrated into virtually any processing system and need not be limited to a video decoding system or even to a real-time processing system. In fact, virtually any shared-memory device, including personal and mainframe computers, control systems, communications and switching systems, handheld computing devices (such as palmtop PC's and cellular phones), and multimedia systems (such as video game systems and audio processing equipment) may incorporate the teachings of this disclosure. Further, it should be understood that the described memory arbitration scheme need not be limited to data decoders but may be used in an encoding system as well. In addition, the described memory arbitration scheme may be adapted to perform memory arbitration for a multiport memory device or a plurality of memory devices by establishing a separate GOFIFO for each memory port or device. An alternative embodiment uses a single GOFIFO to store GO instructions for a plurality of memory devices or memory ports but includes a decoder capable of routing GO instructions from the GOFIFO to the proper port or device.

In addition, the principles of the present disclosure may be used to construct a number of alternative embodiments. In one alternative embodiment, a dedicated microcontroller implements the functions of the control logic of FIG. 4, submitting GO instructions to an separate FIFO. Hence, the control logic, FIFO, and other logic devices within the embedded controller need not be incorporated into the same device but may comprise separate components. In another alternative embodiment, the control logic of FIG. 4 receives a plurality of memory request signals from the various devices that need to access memory. Accordingly, the control logic arbitrates among the pending memory requests. In yet another alternative embodiment, the FIFO queue may be replaced with any suitable storage device, such as a conventional memory device or a state machine circuit. In one other alternative embodiment, a FIFO queue may be used for storing GO instructions that incorporates dequeue logic for releasing the GO instructions, a decoder for translating the GO instructions into GO signals that can be transmitted to decoding devices, or any other suitable logic. Also, an alternative embodiment may include only the control logic for issuing GO instructions and the FIFO for holding GO instructions until a memory device is available for memory transactions.

Numerous variations and modifications will become apparent to those skilled in the art once the above disclosure is fully appreciated. It is intended that the following claims be interpreted to embrace all such variations and modifications.

We claim:

1. A decoding system comprising:
   a memory storage device that stores data;
   a plurality of decoding devices coupled to said memory storage device and which carry out memory transactions with the memory storage device;
   a microcontroller coupled to said memory storage device and to said plurality of decoding devices, comprising:
   a control logic device that issues a primary GO instruction associated with one of said decoding devices; and
   a FIFO that queues the primary GO instruction,
   wherein said one of said decoding devices accesses said memory storage device if the primary GO instruction is dequeued from said FIFO.

2. The decoding system as in claim 1 wherein said microcontroller includes a dequeue logic coupled to said memory storage device and to said FIFO, wherein said dequeue logic causes said FIFO to dequeue the primary GO instruction.

3. The decoding system as in claim 1 wherein said dequeue logic monitors the activity of said memory storage device and dequeues the GO instruction from said FIFO if said memory storage device is available for a memory transaction.

4. The decoding system as in claim 2 wherein said dequeue logic causes said FIFO to dequeue the primary GO instruction if said memory storage device is available for a memory transaction.

5. The decoding system as in claim 2 wherein said microcontroller further includes a multiplexer that receives the primary GO instruction from said FIFO and wherein said multiplexer waits until a first decoding device finishes operating before transmitting the primary GO instruction to a second decoding device.

6. The decoding system as in claim 2 wherein said microcontroller further includes a multiplexer coupled to said FIFO and a default GO unit configured to provide a default GO instruction to said multiplexer, wherein said multiplexer selects the default GO instruction if said FIFO is empty.

7. A microcontroller configured to perform memory arbitration, said microcontroller comprising:
  a processing device that arbitrates among a plurality of devices that need memory access; and
  a data queue coupled to said control logic and configured to queue memory grant instructions from said processing device,
  wherein said microcontroller provides a memory grant signal to one of said plurality of devices by dequeueing a memory grant instruction from said data queue.

8. The microcontroller as in claim 7 including a dequeue logic coupled to said data queue, said dequeue logic configured to receive READY signals indicating that a memory storage device is available for a memory transaction, wherein said dequeue logic asserts a DEQUEUE signal to said data queue if the READY signals are asserted.

9. The microcontroller as in claim 8 further configured to receive a conditional READY signal, wherein said processing device stores conditional memory grant instructions into said data queue and asserts said conditional READY signal only if said conditional memory grant signal is dequeued.

10. The microcontroller as in claim 9 including a multiplexer coupled to said data queue and to said conditional READY signal, wherein said multiplexer provides a memory grant signal associated with a conditional memory grant instruction only if the conditional READY signal is asserted.

11. The microcontroller as in claim 8 including a unit coupled to said data queue and to said dequeue logic, wherein said unit provides a default memory grant signal if said data queue is empty when the DEQUEUE signal is asserted.

12. The microcontroller as in claim 11 including a multiplexer coupled to said data queue and to said unit, wherein the data queue provides a FIFO_EMPTY signal to said multiplexer that selects the memory grant signal.

13. A method for performing memory arbitration, including:
  (a) storing a memory grant instruction into a queue; and
  (b) dequeueing a memory grant instruction from said queue when a memory device is available for a memory transaction.

14. The method as in claim 13 including granting memory access by asserting a GO signal associated with the memory grant instruction.

15. The method as in claim 14 wherein step (b) includes:
  receiving a device ready signal; and
  asserting the GO signal only after the device ready signal is asserted.

16. The method as in claim 15 including receiving the memory grant instructions into a multiplexer, wherein the output of the multiplexer is selected based on the device ready signal.

17. The method as in claim 14 including providing a default memory grant instruction if said queue is empty when said memory device is available for a memory transaction.

18. The method as in claim 17 including receiving the memory grant instructions and default memory grant instructions into a multiplexer and providing a queue empty signal to select the output of the multiplexer.

19. The method as in claim 13 wherein step (b) includes:
  (b1) receiving at least one signal indicating that said memory device is available; and
  (b2) asserting a dequeue signal to said queue if said at least one signal indicates that the memory device is available.

20. The method as in claim 13 wherein said queue comprises a first-in, first-out queue.

* * * * *